(12) United States Patent
Steinbock et al.

(10) Patent No.: US 8,360,094 B2
(45) Date of Patent: Jan. 29, 2013

(54) APPARATUS TO MECHANICALLY LOAD A COMPRESSION MEMBER

(75) Inventors: Allan T. Steinbock, Pittsburgh, PA (US); Robert C. Steinbock, Bridgeville, PA (US); Tony Felldin, Fjaras (SE); Gerhard Ploke, Rueeterswil (CH); Norbert Schneider, Uznach (CH)

(73) Assignee: Nord-Lock Switzerland GmbH, Zurich (CH)

( * ) Notice: Subject to any disclaimer, the term of this patent is extended or adjusted under 35 U.S.C. 154(b) by 5 days.

(21) Appl. No.: 12/803,708

(22) Filed: Jul. 3, 2010

(65) Prior Publication Data
US 2010/0278611 A1 Nov. 4, 2010

Related U.S. Application Data

(62) Division of application No. 10/769,348, filed on Jan. 31, 2004, now Pat. No. 7,775,559.

(30) Foreign Application Priority Data

Mar. 20, 2003 (NO) .................................... 20031282

(51) Int. Cl.
*F16K 25/00* (2006.01)

(52) U.S. Cl. .................................................... 137/454.6

(58) Field of Classification Search .................. 285/206, 285/207, 208, 209, 210, 90, 404, 24, 26, 285/27, 29, 39, 309; 403/306; 411/14.5, 411/915–917, 383, 393; 92/171.1; 137/454.6; 417/454; 60/458

See application file for complete search history.

(56) References Cited

U.S. PATENT DOCUMENTS

| | | | | | |
|---|---|---|---|---|---|
| 4,338,037 | A | * | 7/1982 | Deminski | 403/24 |
| 4,927,305 | A | * | 5/1990 | Peterson, Jr. | 411/14 |
| 5,069,587 | A | * | 12/1991 | Levenstein | 411/432 |
| 5,075,950 | A | * | 12/1991 | Steinbock | 29/426.5 |
| 5,083,889 | A | * | 1/1992 | Steinbock | 411/432 |
| 5,372,055 | A | * | 12/1994 | Kelly et al. | 81/53.2 |
| 6,381,827 | B1 | * | 5/2002 | Steinbock | 29/452 |
| 6,712,096 | B1 | * | 3/2004 | Tischler | 138/30 |
| 6,938,450 | B1 | * | 9/2005 | Zhang et al. | 72/60 |
| 7,234,388 | B2 | * | 6/2007 | Orr et al. | 92/171.1 |
| 7,290,560 | B2 | * | 11/2007 | Orr et al. | 137/454.6 |
| 7,775,559 | B2 | * | 8/2010 | Steinbock et al. | 285/90 |
| 7,866,346 | B1 | * | 1/2011 | Walters | 138/89 |

* cited by examiner

Primary Examiner — James Hewitt
(74) Attorney, Agent, or Firm — Paul Bogdon (57) ABSTRACT

A compression generator uses a plurality of jackbolts threadedly engaged at a spaced apart relation about a bolt circle in a main core element. The main core element is releasable interlocked by threads, bayonet connection or other form of fasting system with the mounting element forming a fixed part of the mechanical connection. The jackbolts torqued to generate a pushing force in an axial direction for compressing a moveable part of the mechanical connection against a compression seat for forming a mechanical connection between juxtaposition fixed and moveable parts.

3 Claims, 7 Drawing Sheets

APPARATUS TO MECHANICALLY LOAD A COMPRESSION MEMBER

CROSS-REFERENCE TO RELATED APPLICATIONS

This application is a divisional application of U.S. Ser. No. 10/769,348 filed Jan. 31, 2004, now U.S. Pat. No. 7,775,559, which is incorporated herein by reference in its entirety.

CLAIM TO PRIORITY

This application claims the benefit of Norway Patent Application No. 2003 1282 filed Mar. 20, 2003, the contents of which are hereby incorporated into this application.

BACKGROUND OF THE INVENTION

1. Field of the Invention

The present invention relates to a compression generator using a plurality of jackbolts to apply a mechanical load against a compression member for forming a mechanical connection between opposing fixed and moveable parts, and more particularly, the compression generator uses jackbolts threadedly engaged to a main element which is in turn releasable joined to a fixed part to generate friction by transmitting a pushing force against a surface of a moveable part. The main element may take the form of a core releasable engaged with a support and carrying the jackbolts for compressing a compression element against a compression seat.

2. Description of the Prior Art

One aspect of the present invention is addressed to securing pipes in an end to end relation for creating a high security joint between the pipes to resist the stress and strain encountered in sub-sea environments as, for example, commonly encountered in the offshore petrochemical industry. One intended use in such a sub-sea environment is the connection of large diameter pipes so-called risers, which connect an oil well on the seabed with a terminal at the water surface. When connecting pipe elements using friction to obtain a locking effect in a sub-sea environment, it is difficult with existing technology to withstand the strain occurring when the pipe joint is exposed to waves, axial tensions, vibrations, and loads directed sideways to the extended length of the joined pipes. The reliability of friction as the locking mechanism is therefore often inadequate.

Conventional technology relies solely on the application of torque to one thread in pipe couplings in order to create friction for locking joining male and female elements. This type of friction locking is not always reliable to form a sufficiently secure locking when the locking operation occurs in sub-sea environments where the pipe joints are exposed to sever localized strains. A single bolted joint for pressing two elements apart is detrimentally sensitive to vibrations causing unintentionally loosing of the bolted joint. The present invention provides an new frictional locking system using an axial friction device for pressing mechanical elements apart in such a way that friction is created between the friction device and two or more mechanical elements comprising part of the construction.

Another aspect of the present invention is addressed to using compression generators for assembling components in diverse machinery but particularly pressing a component part against a sealing surface to contain pressurized fluid mediums. Examples of such machinery include high pressure plunger pumps and air compressors powered by prime movers generally having 1000 or more horsepower. Such machinery is frequently located in hostile environments where servicing components subject to wear and tear may be required at regular intervals. Plunger pumps, for example, include a valve manifold containing suction and pressure valves seated by threaded tubes driven against a closure plate by directing impact blows to a torque bar inserted transversely in sidewall openings in the tubes.

It is an object of the present invention to provide a compression generator using friction locking to achieve a considerably higher clamping force by the provision of several jackbolts fitted in threads in either a threaded male or female element, which are used for pressing the friction element against the other element of the joint so that friction is created and the load that gives rise to the desired friction is thus divided between several separate jackbolts.

It is a further object of the present invention to generate a greater and evenly distributed frictional locking for joining pipes in an end-to-end relation in a joint than in previously used technology to produce a joint considerably more resistant to vibrations and axial, radial and sideway directed strains.

It is another object of the present invention to provide a compression generator using friction locking established by a construction and arrangement of parts constructed to fit together in a simple and quick manner.

It is another object of the present invention to provide a compression generator using jackbolts to inhibit sliding movement between members forming a barrier used to confine a volume of highly pressurized fluid.

It is another object of the present invention to provide a compression generator using jackbolts to generate sufficient friction to prevent unwanted leakage of pressurized fluid between seated sealing surfaces.

It is another object of the present invention to provide a compression generator using jackbolts for installing an access plug in a manifold using a core element to form a jackbolt assembly for use as a mechanically operative stress-generating unit releasable attached to the manifold.

It is another object of the present invention to provide a compression generator using jackbolts for installing an access plug in a manifold using a core element to form a jackbolt assembly and a pull back restraint for use as a mechanically operative stress-generating unit releasable attached to the manifold.

It is another object of the present invention to form a compression generator having a support juxtaposition from a compression seat in a manifold closed by a core releasable interlocked with the manifold and carrying a compression element between the core and the compression seat such that a plurality of jackbolts threadedly engaged with the core compresses the compression element against the compression seat.

It is another object of the present invention to provide a compression generator to more evenly distribute a compression force about a surface area where friction is created by the compression generator to form a joint between a support juxtaposition from a joining member to form a joint considerably more resistant to vibrations and axial, radial and sideway directed forces.

SUMMARY OF THE INVENTION

According to the present invention there is provided a compression generator including a plurality of jackbolts receiving torque to generate a pushing force in an axial direction thereof for forming a mechanical connection between opposing fixed and moveable parts, the jackbolts threadedly engaged to a main element which is in turn releasable joined to the fixed part of the mechanical connection to generate friction by transmitting the pushing force against a surface of the moveable part of the mechanical connection.

The present invention also provides a compression generator including a mounting element juxtaposition from a compression seat, a core releasable interlocked with the mounting element; a compression element between the core and the compression seat, and a plurality of jackbolts torqued by threadedly engagement with the core for compressing the compression element against the compression seat.

BRIEF DESCRIPTION OF THE SEVERAL VIEWS OF THE DRAWINGS

The present invention will be more fully understood when the following description is read in light of the accompanying drawings in which.

DETAILED DESCRIPTION OF THE INVENTION

Figure 1:
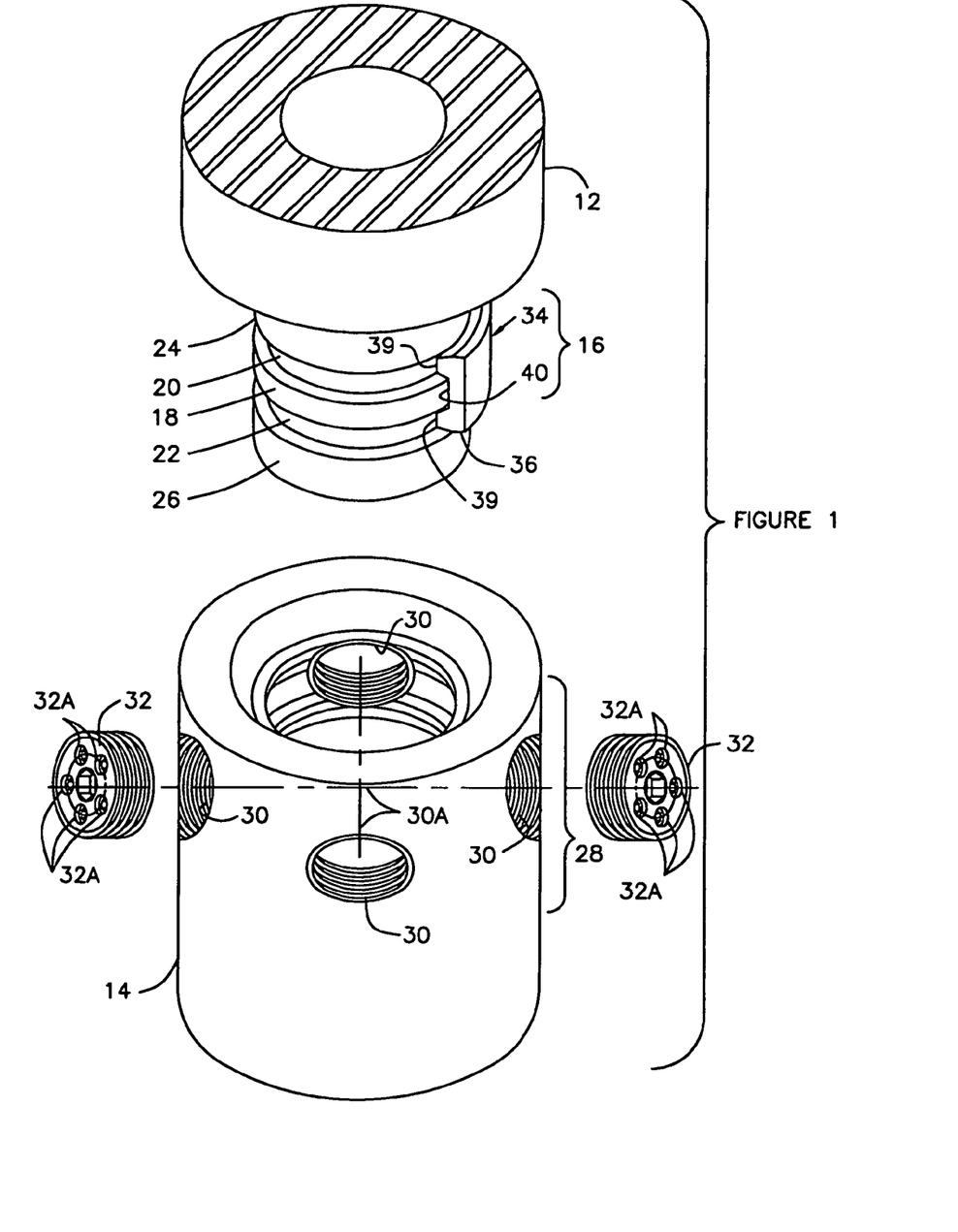
FIG. 1 is a plane view of a first embodiment of the a compression generator embodying the features of the present invention.
Figure 2:
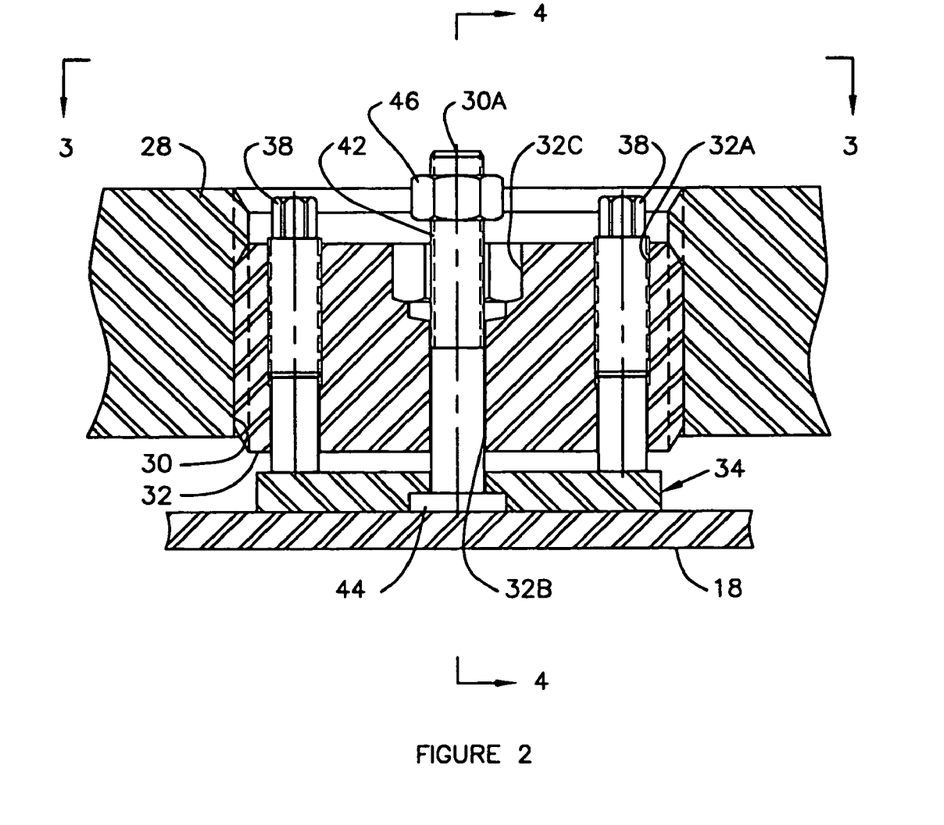
FIG. 2 is a sectional view taken along lines 2-2 of FIG. 1.
Figure 3:
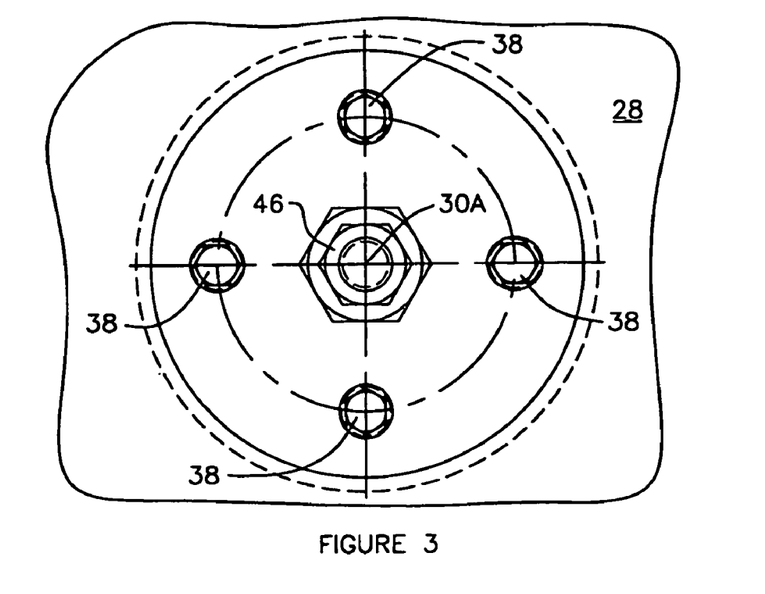
FIG. 3 is a plane view taken along lines 3-3 of FIG. 2.
Figure 4:
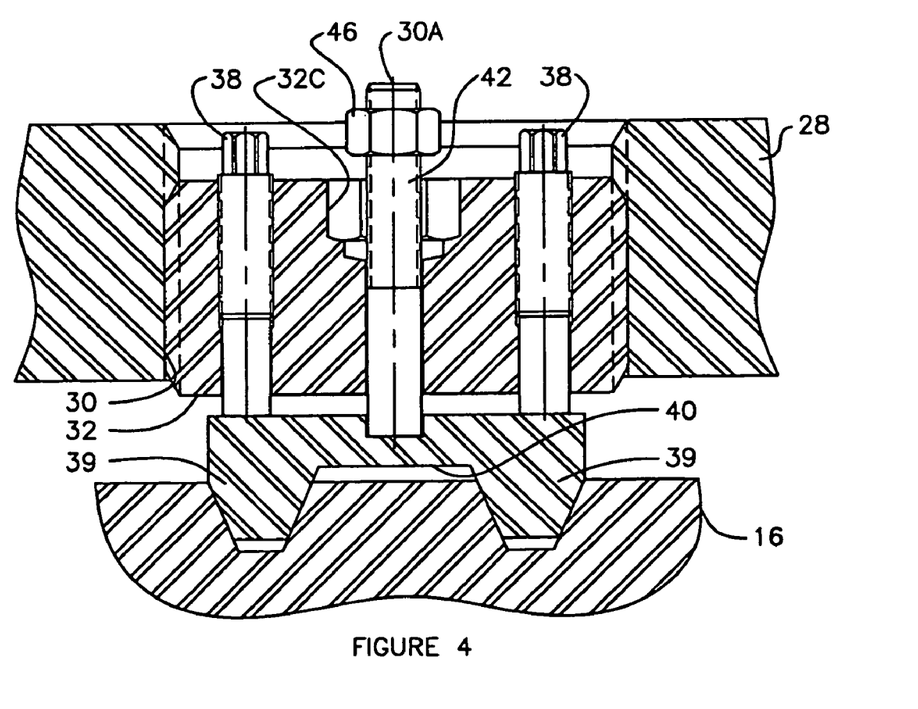
FIG. 4 is a sectional view taken along lines 4-4 of FIG. 2.

FIGS. 1-4 illustrate a first embodiment of a compression generator 10 for generating pushing forces in relative opposite directions e.g. along axial paths, sufficient to form a frictional interconnection between elongated pipe members 12 and 14 embodied as relatively large diameter pipes of the type used in sub-sea installations for offshore oil and gas wells. The pipe member 12 includes an end portion 16 containing a centrally located annular ring section 18 bounded by annular groves 20 and 22 terminating at annular ring sections 24 and 26 of reduced outside diameters as compared with the outside diameter of the pipe 12. The pipe member 14 includes a connector portion 28 constructed with at least one, preferably four, threaded bores 30 arranged with the central axes 30A of each bore, preferable lying in a common plane that is perpendicular to the longitudinal and central axis of the pipe member 14. When four threaded bores are provided, they are preferably arranged as opposed pairs having the axes 30A of a pair of coaxially arranged. Threads on the external peripheral edge of a disk shaped carrier 32 engage with the threads of each of the bores 30 for mounting the carrier in a load transferring relation in the connector portion 28 of the pipe member 14. The thickness of the disk shaped threaded carrier approximates the wall thickness of the end portion 28 of the pipe member 14. The threaded carrier 32 is provided with a plurality of drilled and tapped holes 32A spaced about a bolt circle centered on the axis 30A to receive a jack bolt 38 having a sufficient length to present an end portion extending into an abutting relation with an arcuate compression shoe 34. The compression shoe includes an arcuate base 36 containing two parallel and side-by-side compression ribs 39 spaced apart by a central recess 40 to establish interlocking engagement with the annular support ring section 18 and the annular groves 20 and 22, as shown in FIG. 1. This arcuate inter fitting relationship of the compression shoe pressed against the support ring section 18 by the pushing force generated by the jack bolts 38 establishes a mechanical interconnection between the large diameter pipes of great and long lasting integrity. Positioning of the compression shoe in compression generator 10 before generating the pushing forces is limited to linear movement by sliding of a spindle 42 in bore 32B along axis 30A while joined by a T-shaped end 44 mounted in a corresponding shaped T-slot formed in the arcuate base 34. A nut 46 mounted on an outwardly extending threaded end of the spindle 42 is dimensioned to seat in a counter bore 32C to provide guided movement of the spindle throughout a desired range in an annular gap between the end portions 16 and connector portion 28.

Figure 5:
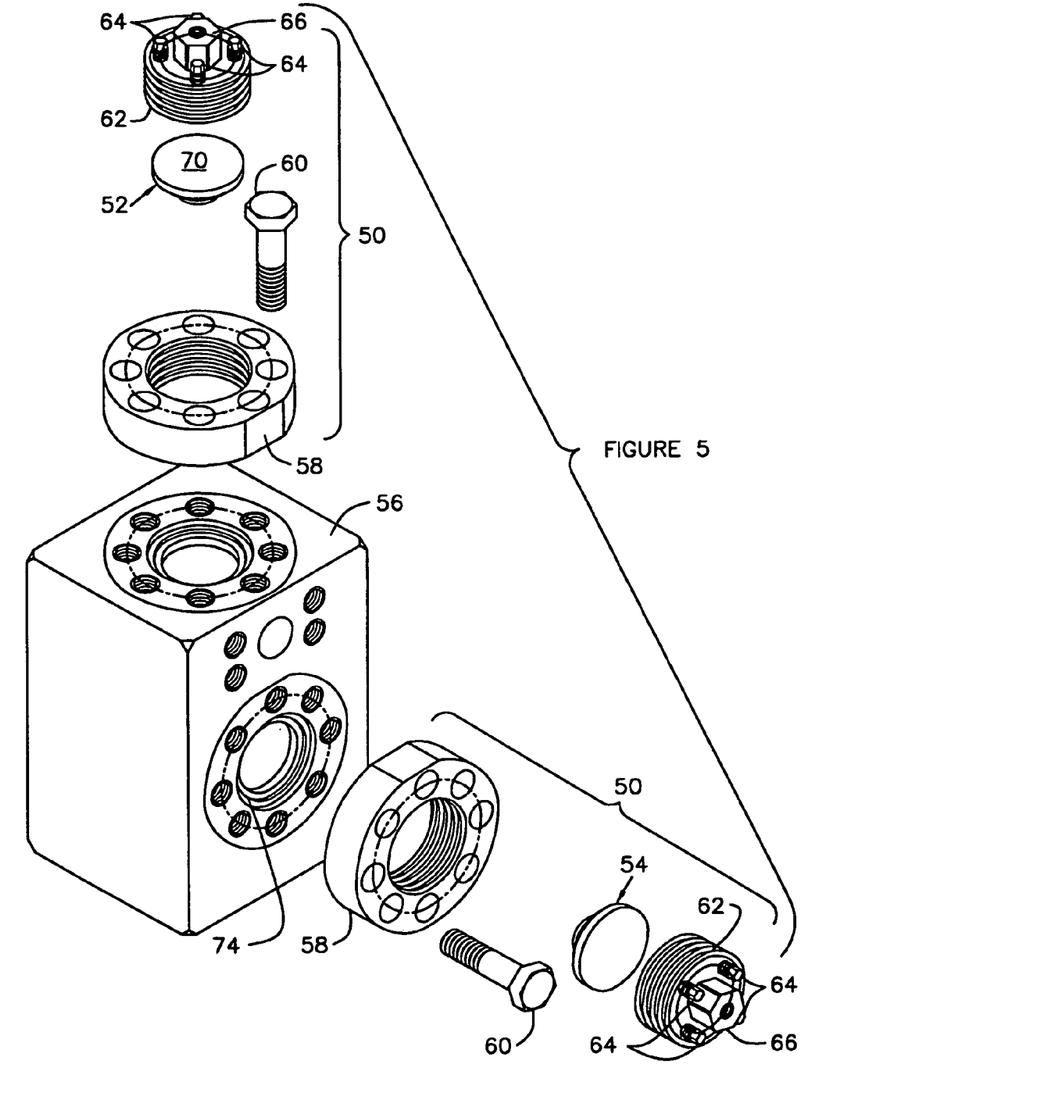
FIG. 5 is an isometric illustration of a second embodiment of a compression generator embodying the features of the present invention.
Figure 6:
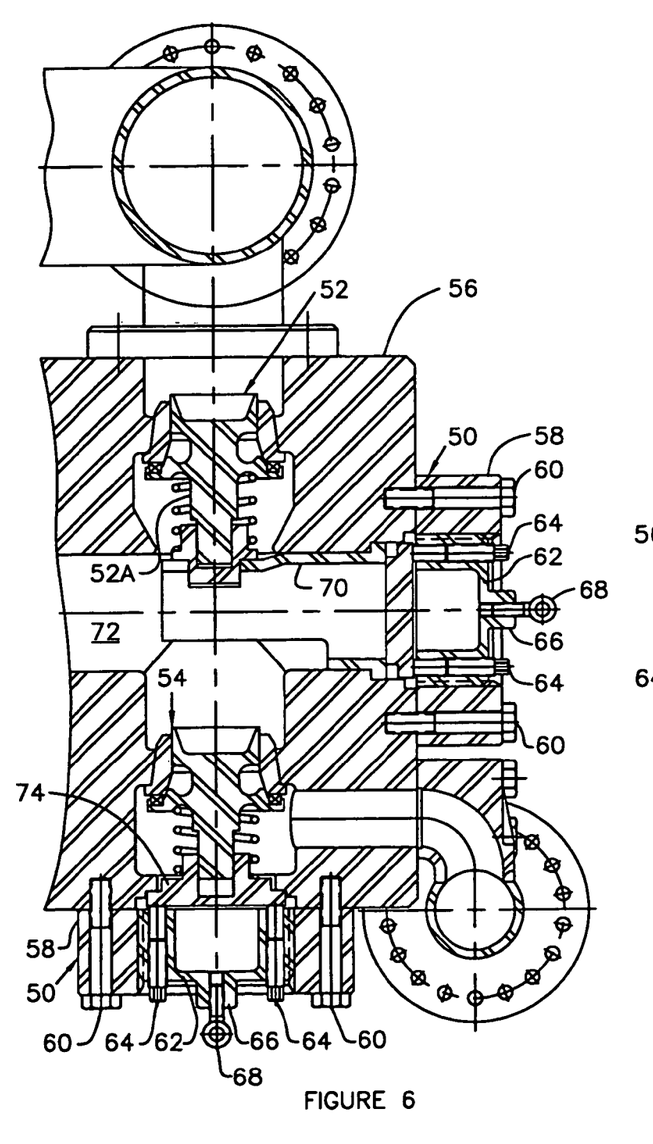
FIG. 6 is a sectional view taken along lines 6-6 of FIG. 5.
Figure 7:
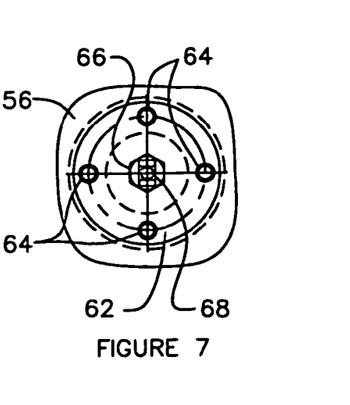
FIG. 7 is a plane view taken along lines 7-7 of FIG. 5.

FIGS. 5, 6 and 7 illustrate a second embodiment of compression generators 50 according to the present invention embodied as retainer cores for suction and pressure valves 52 and 54, respectively in a valve manifold 56. Two independent collars 58 are attached by threaded fasteners 60 to the sidewalls of the valve manifold 56. Each collar has a central opening containing screw threads, bayonet lugs, or component parts of other suitable fastening systems for interlocking engagement to mount a disk shaped access plug 62. In this illustrated embodiment, the collar and plug for each compression generator have mating screw threads. Each disk shaped access plug contains a plurality of threaded bores distributed about a bolt circle and receiving jackbolts 64 for generating pushing forces along axial paths corresponding to the longitudinal central axes of the jackbolts. This assembly the jackbolts form a mechanically operative stress-generating unit releasable attached to the manifold.

A hex nut member 66 is located in the central face area of the collar for torquing the access plug during assembly and disassembly of the access plug in the collars 58. A centrally located aperture is threaded to engage a threaded end of an eyebolt 68 used as an aid when handling the access plug. The suction valve 52 is mounted in a holder 70 pressed by operation of the jackbolts 64 against a mounting surface located in the valve manifold 56 to present the suction valve 52 in an operative position extending in a pressure chamber 72 so that a spring biased valve plunger 52A of the valve is seated against a valve seat provided in a valve manifold 56. In this manner, the jackbolts are used to inhibit sliding movement between members forming a barrier used to confine a volume of highly pressurized fluid and generate sufficient friction to prevent unwanted passage of pressurized fluid between seated sealing surfaces. The pressure valve 54 is pressed by operation of the jackbolts 64 against a mounting surface 74 formed in a high pressure exhaust chamber of the valve manifold 56 and thereby position a spring biased valve plunger 54A against a valve seat located in a in a valve manifold 56. A fluid medium, such gas, or liquid is acted on by operation of a piston reciprocated in a chamber communicating with a port 56A.

Figure 8:
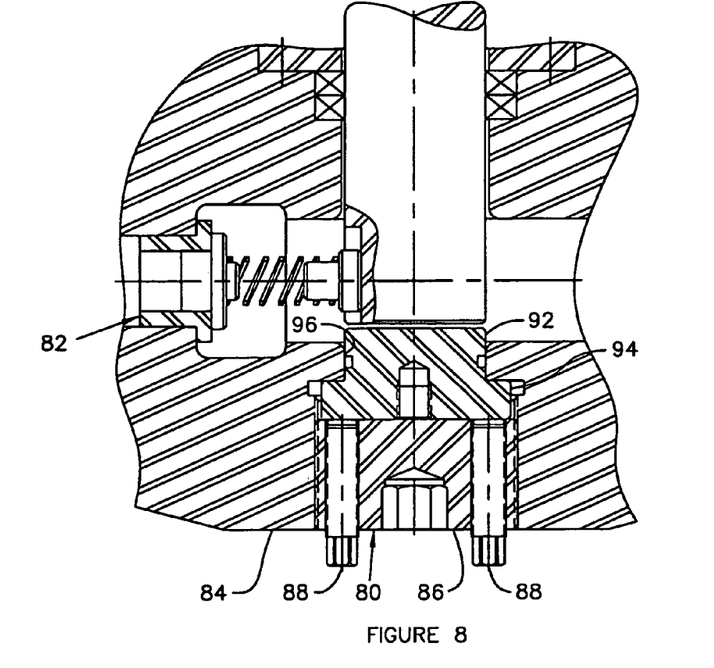
FIG. 8 is a sectional view similar to FIG. 6 and illustrating a third embodiment of compression generators embodying the features of the present invention.
Figure 9:
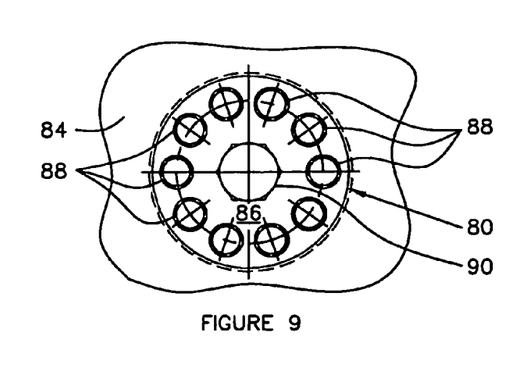
FIG. 9 is a plane view taken along lines 8-8 of FIG. 8.

FIGS. 8 and 9 illustrate a third embodiment of compression generators 80 according to the present invention embodied as a retainer for providing access to a suction valve 82 in a valve manifold 84. A core element is provided by a disk shaped retainer 86 is secured by a threaded periphery to the threads in an aperture formed in the sidewall of the valve manifold 84.

An alternative to the use of screw threads for mounting the retainer to the valve manifold is bayonet lugs or component parts of other suitable fastening systems. The disk shaped access retainer contains a plurality of threaded bores distributed about a bolt circle and receiving jackbolts 88 for generating pushing forces along axial paths corresponding to the longitudinal central axes of the jackbolts. This assembly of jackbolts serves to provide a mechanically operative stress-generating unit releasable attached to the manifold.

A hex nut cavity 90 is located in the central face area of the retainer for torquing the retainer during assembly and disassembly of a suction valve cover 92 in the manifold. The suction valve cover 92 is pressed into seating engagement against mounting surface 94 by operation of the jackbolts 88, which also maintains an O-ring in an annular recess seated against the annular sidewall 96 extending to the mounting surface. The use of the jackbolts facilitate removal of the retainer and the suction valve cover for routine inspection and servicing of a suction valve mounted in the valve manifold and generate sufficient friction to prevent unwanted passage of pressurized fluid between seated sealing surfaces.

Figure 10:
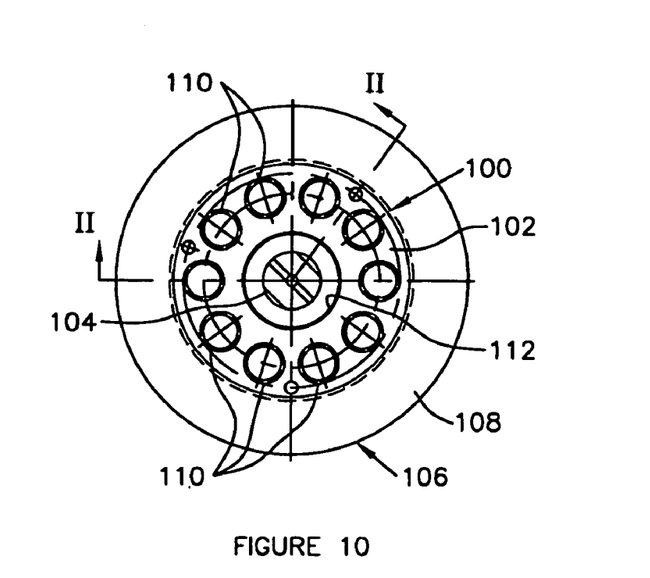
FIG. 10 illustrates a third embodiment of compression generator according to the present invention for installing a high-pressure fluid orifice in an accumulator. assembly.
Figure 11:
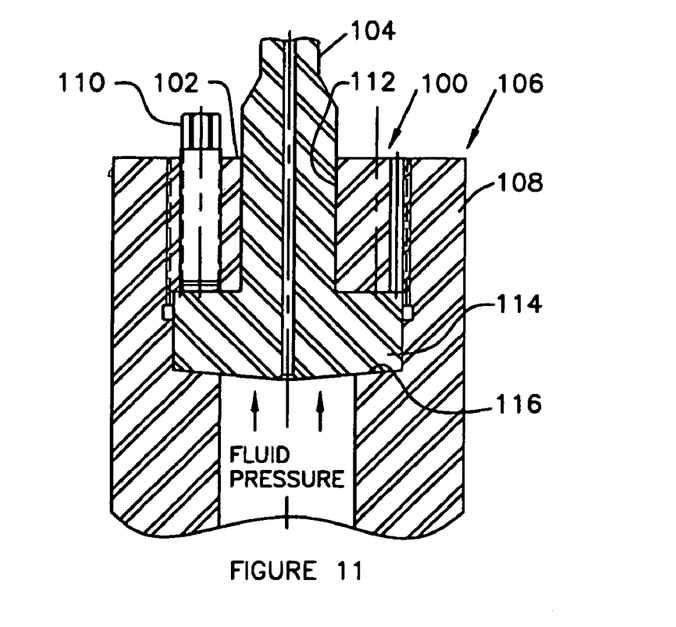
FIG. 11 is a sectional view taken along lines 11-11 of FIG. 10.

FIGS. 10, and 11 illustrate a third embodiment of compression generators 100 according to the present invention embodied as retainers 102 for installing a high pressure fluid orifice 104 at an end of an accumulator assembly 106 forming part of a high pressure water jet system. A core element is provided by a disk shaped configuration of the retainer 102 mounted by a threaded periphery to the threads in an aperture formed in an enlarged bore at the end portion of a cylindrical member 108. The disk shaped retainer 102 contains a plurality of threaded bores distributed about a bolt circle and receiving jackbolts 110 for generating pushing forces along axial paths corresponding to the longitudinal central axes of the jackbolts. This assembly of jackbolts also serves to provide a mechanically operative stress-generating unit releasable attached to the cylindrical member 108. A central bore 112 in the disk shaped retainer 102 allows a mechanically free passage of a reduced diameter nozzle portion of the high-pressure fluid orifice 104. The high-pressure fluid orifice 104 has an enlarged cylindrical base 114 pressed into a seated, fluid tight engagement juxtaposition from a compression seat formed by mounting surfaces 116 by operation of the jackbolts 110 without the use of an O-ring or other form of a seal.

While the present invention has been described in connection with the preferred embodiments of the various figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the recitation of the appended claims.

The invention claimed is:

1. A compression generator assembly comprising:
a valve manifold;
a compression generator comprising:
   a fixed part comprising a collar;
   a moveable part comprising a valve;
   a carrier comprising a round-shaped access plug and including threads on the external peripheral edge of said carrier for retained support by said fixed part and in a confronting relation to said moveable part, and
   a plurality of jackbolts each received in one of a plurality of holes at spaced-apart locations about an outer peripheral part of said carrier;
wherein said collar is mounted against said valve manifold and which collar is releasably joined by threaded fasteners to said valve manifold, said collar having a central opening containing screw threads to receive the threads of said carrier; and
wherein said fixed part and said moveable part form a mechanical connection therebetween by transmitting a pushing force against a surface of said moveable part, and said jackbolts receive torque to generate said pushing force.

2. The compression generator assembly according to claim 1 further including a wrench grip provided by a hex nut member located in the central face area of said collar for torqueing said carrier during assembly and disassembly of the said carrier in said collar and centered on a side of said carrier directed away from said surface of said moveable part of said mechanical connection where friction is generated by transmitting said pushing force.

3. The compression generator assembly according to claim 2 further including an eyebolt assembly extending in said hex nut member and along said central opening in said collar.

\* \* \* \* \*